United States Patent
Mair et al.

(10) Patent No.: US 11,126,408 B2
(45) Date of Patent: Sep. 21, 2021

(54) INCREMENTAL CODE GENERATION METHOD

(71) Applicant: dSPACE digital signal processing and control engineering GmbH, Paderborn (DE)

(72) Inventors: Michael Mair, Paderborn (DE); Sebastian Moors, Paderborn (DE); Zein Dowe, Paderborn (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 0 days.

(21) Appl. No.: 17/023,418

(22) Filed: Sep. 17, 2020

(65) Prior Publication Data

US 2021/0096830 A1    Apr. 1, 2021

(30) Foreign Application Priority Data

Sep. 17, 2019   (DE) .......................... 102019124956.2

(51) Int. Cl.
| | | |
|---|---|---|
| *G06F 9/44* | (2018.01) | |
| *G06F 8/35* | (2018.01) | |
| *G06F 9/38* | (2018.01) | |
| *G06F 11/10* | (2006.01) | |
| *G06F 8/33* | (2018.01) | |

(52) U.S. Cl.
CPC ................. *G06F 8/35* (2013.01); *G06F 8/33* (2013.01); *G06F 9/3836* (2013.01); *G06F 11/1004* (2013.01)

(58) Field of Classification Search
None
See application file for complete search history.

(56) References Cited

U.S. PATENT DOCUMENTS

| | | | | |
|---|---|---|---|---|
| 9,244,664 | B1* | 1/2016 | Huang | G06F 8/4434 |
| 2014/0380269 | A1* | 12/2014 | Conrad | G06F 11/3604 |
| | | | | 717/104 |
| 2015/0268954 | A1* | 9/2015 | Sasaki | G06F 8/61 |
| | | | | 717/123 |
| 2017/0293474 | A1* | 10/2017 | Sellers-Blais | G06F 8/41 |
| 2018/0024814 | A1* | 1/2018 | Ouali | G06F 11/3688 |
| | | | | 717/105 |
| 2018/0088911 | A1* | 3/2018 | Moors | G06F 8/71 |
| 2019/0163446 | A1* | 5/2019 | Brunel | G06F 11/3604 |

* cited by examiner

*Primary Examiner* — Insun Kang
(74) *Attorney, Agent, or Firm* — Leydig, Voit & Mayer, Ltd.

(57) ABSTRACT

Source code is generated from one or a plurality of blocks of a block diagram. The block diagram is hierarchical and includes at least a first subsystem that is configured for an incremental code generation. The block diagram references a definition database which includes a first object. The method for generating the source code includes: opening, by a computer system, the block diagram including the first subsystem in a model editor; generating, by the computer system, source code for the first subsystem, wherein generating the source code for the first subsystem includes determining information about the first subsystem; storing, by the computer system, the information about the first subsystem in the first object; and generating, by the computer system, source code for the block diagram, wherein the first object is read out to influence at least one parameter for generating the source code for the block diagram.

11 Claims, 4 Drawing Sheets

INCREMENTAL CODE GENERATION METHOD

CROSS-REFERENCE TO PRIOR APPLICATIONS

Priority is claimed to German Patent Application No. 102019124956.2, filed on Sep. 17, 2019, the entire disclosure of which is hereby incorporated by reference herein.

TECHNICAL FIELD

The present invention relates to the generation of executable code from a block diagram, in particular for programming control units.

BACKGROUND

Control units are used in a plurality of applications to record physical quantities of a process and/or act on a process via connected actuators; an example is an antilock control of a braking operation. The time constants, which determine the dynamic behavior of the process, often require cycle times of 1 ms or less, so that a real-time capability of the control unit is needed.

To accelerate the design of control units, control strategies are often developed on the basis of models in a computing environment, such as MATLAB/Simulink. Thus, the process and/or controller, that is generally the behavior of the control unit, can first be simulated and the presence of desired properties checked. Specifically, the models can be block diagrams which include blocks for performing operations, such as computations, a block being able to compute an output signal, for example, from a plurality of input signals. Block diagrams are typically executed cyclically, all blocks being permanently held in the memory, and each block being executed once per time step. In particular, a block can perform one or a plurality of operations on input signals from the most recent step to generate output signals of the current step. Besides a cyclically executed submodel for describing approximately continuous-time behavior, block diagrams can also include a submodel for describing a discrete behavior in which a number of states and transition conditions are defined.

From the models, a code generator can directly generate source code for programming the control unit. For example, a code generator for generating production-quality source code is known from the document "Production Quality Code Generation from Simulink Block Diagrams," *Proceedings of the* 1999 *International Symposium on Computer Aided Control System Design*, Kohala Coast, Hi., by H. Hanselmann et al. In this case, the generated production code can be adapted by an additional annotation of the blocks and, accordingly, block variables. In particular, a model originally created for the computation performed using high-accuracy floating-point variables can be provided with scalings, whereby the control unit can make a computation using fixed-point numbers to substantially reduce computational outlay with minimal loss of accuracy.

For many years, the development partnership AUTOSAR (AUTomotive Open System ARchitecture) has defined a software framework for developing control unit software (detailed information can be found at www.autosar.org). Prior to implementation of the actual control strategy or the desired behavior, an architecture of the software is defined. For example, the software architecture can correspond to the AUTOSAR classic platform standard version 4.3.0 of Nov. 30, 2016. The architecture includes software components, subcomponents such as runnables, and interfaces of software components. The messaging among the various software components is carried out via the virtual function bus of a runtime environment (RTE), which is generated in a manner that is tailored to the specific control unit on the basis of the defined architecture.

In relatively large development projects, different areas of development are often carried out by a plurality of people, who can also work in different companies. Thus, a plurality of function developers can create and improve individual parts of the model. Once created, a submodel can also be used for various projects and adapted in functionality. It is expedient here when an incremental code generation takes place, thus, code being generated separately for individual submodels and, accordingly, code generation units and then combined to form the production code for the complete model. In known methods heretofore, the disadvantage of an incremental code generation is that, in certain circumstances, the code is not able to be optimized as efficiently as when a continuous code generation run is carried out for the complete model.

SUMMARY

In an exemplary embodiment, the present invention provides a method for generating source code from one or a plurality of blocks of a block diagram. The block diagram is hierarchical and includes at least a first subsystem that is configured for an incremental code generation. The first subsystem is encompassed by a second subsystem. The block diagram references a definition database which includes a first object. The method includes: opening, by a computer system, the block diagram including the first subsystem in a model editor; generating, by the computer system, source code for the first subsystem, wherein generating the source code for the first subsystem includes determining information about the first subsystem; storing, by the computer system, the information about the first subsystem in the first object; and generating, by the computer system, source code for the block diagram, wherein the first object is read out to influence at least one parameter for generating the source code for the block diagram.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
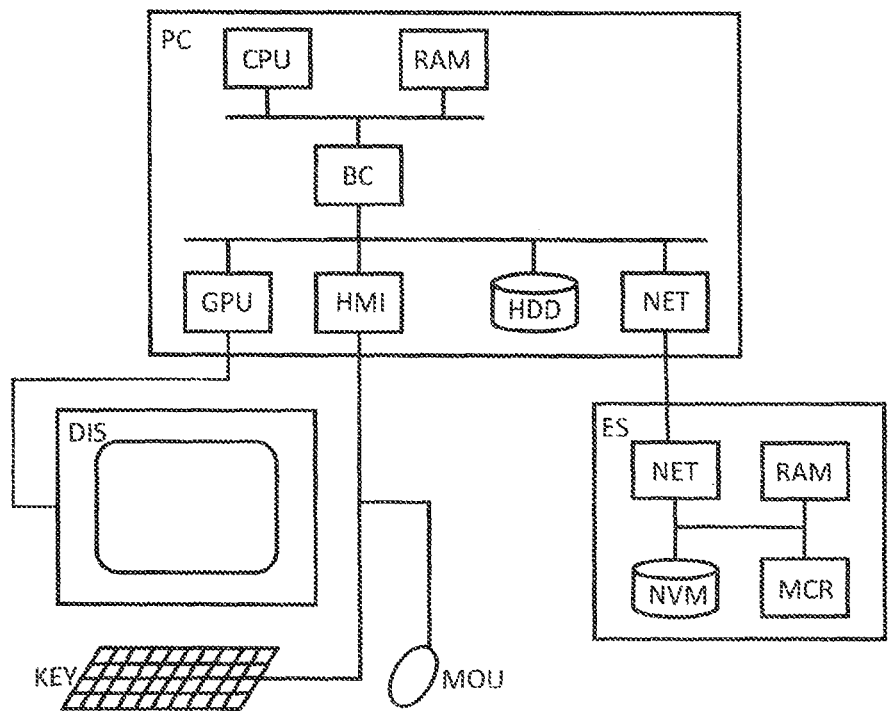
FIG. 1 shows an exemplary embodiment of a computer system.

Exemplary embodiments of the present invention provide better code optimization for models from a plurality of independent code generation units.

Exemplary embodiments of the present invention include a method for generating source code, a computer program product, and a computer system.

In an exemplary embodiment, a method is provided for generating source code from one or a plurality of blocks of a block diagram, the block diagram being hierarchical and including at least a first subsystem that is adapted for an incremental code generation, the first subsystem being encompassed by a second subsystem, the block diagram referencing a definition database which includes a first object. The method includes the steps of opening the block diagram, including the first subsystem, in a model editor, generating source code for the first subsystem, generating source code including determining information about the first subsystem, storing information about the first subsystem in the first object, and generating source code for the block diagram, the first object being read out to influence at least one parameter of the code generation.

At least one optimization performed in the generation of source code for the block diagram is preferably performed or not performed as a function of an information item from the first object. Thus, in particular, the parameter of the code generation may be the activation of a specific optimization, such as, for example, a more efficient system of write and/or read accesses to variables.

The generated source code is preferably stored; in the case of a renewed code generation for the block diagram, new source code is generated or previously generated source code continues to be used as a function of an information item from the first object for the second subsystem. The generated source code and/or the information from the first object on the generated source code can also be stored in a version control system, so that the selection can be made, in particular among various versions of code and corresponding information.

It is advantageous when the first object includes information about a global variable access modeled in the first subsystem, and/or a checksum of the first subsystem, and/or a checksum of code generated for the first subsystem, and/or information about libraries used by the first subsystem, and/or information about resources used by the first subsystem, and/or information about an interface invocation modeled in the first subsystem.

For nested subsystems, in particular when the first subsystem itself includes at least a third subsystem, information about global variable accesses occurring in the third subsystem and/or libraries used in the third subsystem and/or checksums describing the third subsystem and/or information about an interface invocation modeled in the third subsystem may also be stored in the first object, in particular summed with corresponding information about the first subsystem. Such an aggregated view, which summarily describes the invoked code generation units (CGUs) and thus makes possible an accelerated reading out of the information relevant to the respective hierarchy level, is advantageous for deeply nested CGU hierarchies, in particular.

When the generated code includes definitions of interfaces, at least one interface definition is preferably removed or shortened on the basis of the information from the first object. Interface definitions typically include all elements that are made available; if only individual information items from a plurality of offered information items are actually needed, code size may be significantly reduced.

If the second subsystem models a software component in a predefined architecture, in particular in accordance with the AUTOSAR Classic Platform standard, it is preferred that code for defining data types and/or interfaces be created or shortened on the basis of the first object. From the various interfaces, data types and ports provided in accordance with AUTOSAR, the portions not required in the present model may be removed taking into account the information about the first subsystem.

In the case that the generated source code is subsequently compiled and linked, at least one reference to a library or binary file may be expediently removed from the original reference list on the basis of the information from the first object. Libraries may reach a considerable size and inflate the code stored on the control unit; a compact control unit program is achieved by removing references or libraries that are not required.

Data or signals may be transmitted via a signal connection; here, a first block outputs a value or, depending on the definition, a plurality of associated values, and a second block receives these and takes them into account when determining one or a plurality of associated output values of the second block. Signals may include scalar variables and/or structured data types, such as arrays, as is typical in the case of a bus, for example.

The present invention has the advantage that, when incremental CGUs are used, certain code optimizations are made possible which previously had to be omitted. It is also possible to perform additional validations and consistency checks even before the code generation and thus to reduce the development time required, in particular for debugging. By providing a central and robust repository for the exchange of information between incremental code generation units, additional functionalities may also be provided, such as, in particular an especially lean build, respectively executable code which contains only libraries, that is binary files that are actually required. Thus, exemplary embodiments of the present invention may also make it possible for the generated code or the generated binary files to be further adapted: Interfaces, which are made available, may be thinned out or rather shortened on the basis of the information contained in the data definition collection. Binary or source code library contents may not even be introduced into the build process when it is apparent from the stored information that they are not needed.

The present invention also relates to a computer program product having a computer-readable storage medium on which instructions are embedded which, when executed by a processor, have the effect of adapting the processor to execute a method in accordance with an exemplary embodiment of the present invention.

The present invention also relates to a computer system including a human-machine interface, a non-volatile memory and a processor, the processor being adapted to execute a method in accordance with an exemplary embodiment of the present invention.

The present invention is clarified in greater detail in the following with reference to the drawings. Here, like parts are denoted by identical designations. The illustrated exemplary embodiments are highly schematized; i.e. the distances and the lateral and vertical dimensions are not to scale and, unless indicated otherwise, also do not have any geometric relationships that are derivable therefrom.

FIG. 1 shows an exemplary embodiment of a computer system PC. It has a processor CPU, which, in particular, may be realized as a multicore processor, a main memory RAM and a bus controller BC. Computer system PC is preferably designed to be manually operated directly by a user; a monitor DIS being connected via a graphics card GPU, and a keyboard KEY and a mouse MOU via a peripheral interface HMI. In principle, the human-machine interface of computer system PC could also be in the form of a touch interface. Furthermore, the computer system includes a non-volatile data memory HDD, which, in particular, may be in the form of a hard disk and/or solid state disk, as well as an interface NET, in particular a network interface. A control unit ES may be connected via interface NET. In principle, one or a plurality of any desired interfaces, in particular wired interfaces, may be present on computer system PC and be used in each case for the connection to a control unit ES. A network interface according to the Ethernet standard may be expediently used; interface NET may also be in a wireless form, in particular as a wireless local area network (WLAN) interface or in accordance with a standard such as Bluetooth.

Control unit ES may be realized as a production control unit or as an evaluation board for a target platform. It expediently includes an interface NET for connection to computer system PC, a microcontroller MCR having an architecture that deviates from the processor of the computer system, a main memory RAM and a non-volatile memory NVM.

Figure 2:
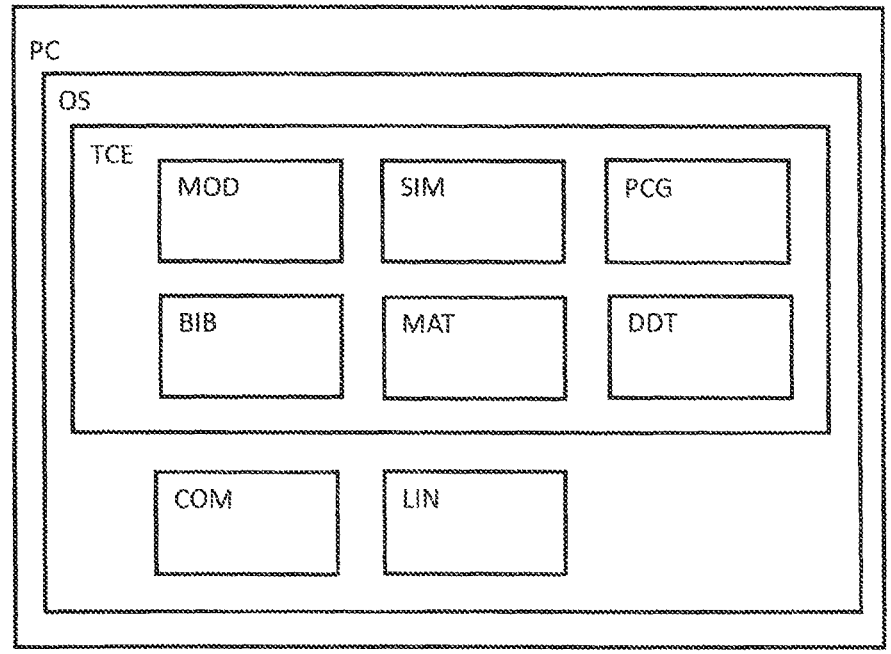
FIG. 2 is a schematic representation of the software components that are preferably present on a computer system.

FIG. 2 is a diagrammatic representation of the software components that are preferably installed on computer system PC. They use mechanisms of operating system OS in order to access non-volatile memory HDD, for example, or to establish a connection to an external computer via network interface NET.

A technical computing environment TCE makes it possible for models to be created and for source code to be generated from the models. In a modeling environment MOD, models of a dynamic system may preferably be created via a graphical user interface. It may be a question here of block diagrams, in particular, which include a plurality of blocks and describe the temporal behavior and/or internal states of a dynamic system. At least some of the blocks are connected via signals, thus, directed connections for exchanging data, which may be scalar or composite. Blocks may be atomic, thus, in one step, provide a predefined functionality. If block diagrams are hierarchical, a multiplicity of blocks at a subordinate level may describe the structure of a block at a superordinate level. Atomic blocks may then also expediently include a multiplicity of blocks at a subordinate level. In particular, composite blocks may be subsystems; subsystems may have additional properties, such as implementation in a separate function and/or a triggering implementation of the subsystem via a dedicated signal. Special blocks may be located in subsystems to further specify the properties thereof. Computing environment TCE includes one or a plurality of libraries BIB, from which blocks, that are modules for building a model may be selected. In a scripting environment MAT, instructions may be entered interactively or via a batch file to perform computations or modify the model. Furthermore, computing environment TCE includes a simulation environment SIM, which is adapted for interpreting or executing the block diagram in order to analyze the temporal behavior of the system. These computations are preferably performed using high-accuracy floating-point numbers on one or a plurality of cores of microprocessor CPU of the computer system.

From a created model, a source code may preferably be generated in a programming language, such as C, with the aid of a code generator PCG. Additional information about the model, in particular about the block variables, is expediently provided in a data definition collection DDT. Ranges of values and/or scalings are expediently assigned to the block variables to support a computation of the model using fixed point instructions. Desired properties of the source code, for example, conformity to a standard such as MISRA, may also be set and, accordingly, stored in data definition collection DDT. Each block variable is expediently assigned to a predetermined variable type, and one or a plurality of desired properties, such as, for example, the admissibility of optimizations, such as a combining of variables, are/is set. Code generator PCG preferably evaluates the settings of data definition collection DDT and takes these into account when generating the source code. Data definition collection DDT may have a tree structure and respectively be stored as a simple file in a memory of the computer system; alternatively, it may be provided that the data definition be stored in a dedicated database system. The data definition collection may have a program interface and/or import/export functions.

Computer system PC has a compiler COM and a linker LIN, which are expediently adapted for generating binary files that are executable on a control unit ES and/or on computer system PC. In principle, a multiplicity of compilers may be present, in particular cross-compilers for various target platforms, in order to support control units, respectively evaluation boards ES having different processor architectures.

Figure 3:
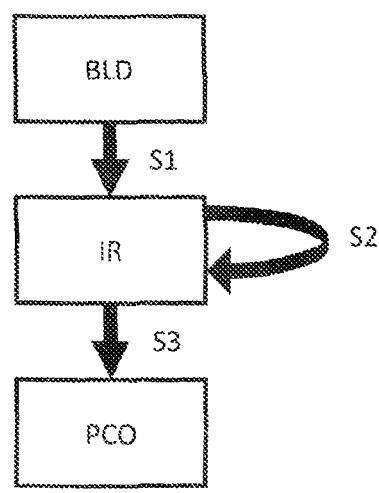
FIG. 3 is a general diagrammatic representation of the generation of source code.

FIG. 3 is a general diagrammatic representation of a code generator generating source code. The method may be completely executed by a processor of an exemplary embodiment of computer system PC; for execution in a client-server environment, however, it may also be provided with a service computer and one or a plurality of network-connected servers, specifically, computationally intensive steps being performed on the servers.

In a first step S1, a transformation, the selected model is transformed from one or a plurality of blocks of block diagram BLD into an intermediate representation IR, which preferably includes one or a plurality of hierarchical graphs. In particular, this may be a data flow graph, a control flow graph or a tree structure. In addition to block diagram BLD, additional information from a data definition collection DDT is also expediently considered during generation of the intermediate representation, respectively flows thereinto. This may also include situations where elements are generated on the basis of information in data definition collection DDT, or properties of elements, respectively settings relevant to the code generation, such as the data type of a variable, for example, are extracted from data definition collection DDT.

In a second step S2, an optimization, the hierarchical graphs are optimized to reduce the number of required variables and/or a memory usage, such as a stack allocation, and/or the number of operations, respectively processor instructions and/or the execution time of the source code. This optimization may include a multiplicity of intermediate steps in which further intermediate representations between the model/block diagram and the source code/program text are generated. In particular, it may be provided in each intermediate step for a set of original hierarchical graphs to be converted into a different set of modified hierarchical graphs, one or a plurality of optimization rules being applied. Various strategies, such as "constant folding," or an elimination of "dead code" may be applied during the optimization. It may also be provided for individual optimizations to be applied already in the course of the transformation of step S1, particularly when they are able to be more readily performed on a block diagram representation. In exemplary embodiments of the present invention, it is possible both for a plurality of variables generated in step S1 to be combined in step S2 and for a plurality of variables of the block diagram to be combined in step S1 in a way that enables already the first intermediate representation to include just one variable.

In a third step S3, a translation, optimized intermediate representation IR, respectively optimized hierarchical graphs, which result from the totality of intermediate steps performed, are translated into source code PCO of a textual programming language, such as, in particular, C code. In this step as well, a further optimization may take place, in particular in a way that enables the generated instructions to represent a subset of the instructions basically included in the language, and/or the generated control structures to represent a subset of the control structures basically included in the language. Precisely defined rules may thereby be satisfied. Alternatively or additionally, it may be provided for additional information to be generated, such as, for example, a reference between the program line and the block of block diagram BLD, and, in particular, integrated as comments into the source code, in order to improve the readability of source code PCO and/or simplify a debugging.

During or subsequently to the code generation, information about the current block diagram or results of the code generation, such as warnings, for example, may be stored in the data definition collection. This information may be used, for example, to influence a compilation of the generated source code or provide metainformation for other tools, for example, such as calibration information in ASAP2 format or information for generating an intermediate layer according to the AUTOSAR standard. Alternative exemplary embodiments of the present invention may provide that code in a hardware description language or a configuration of a programmable hardware module be generated from the block diagram.

Figure 4:
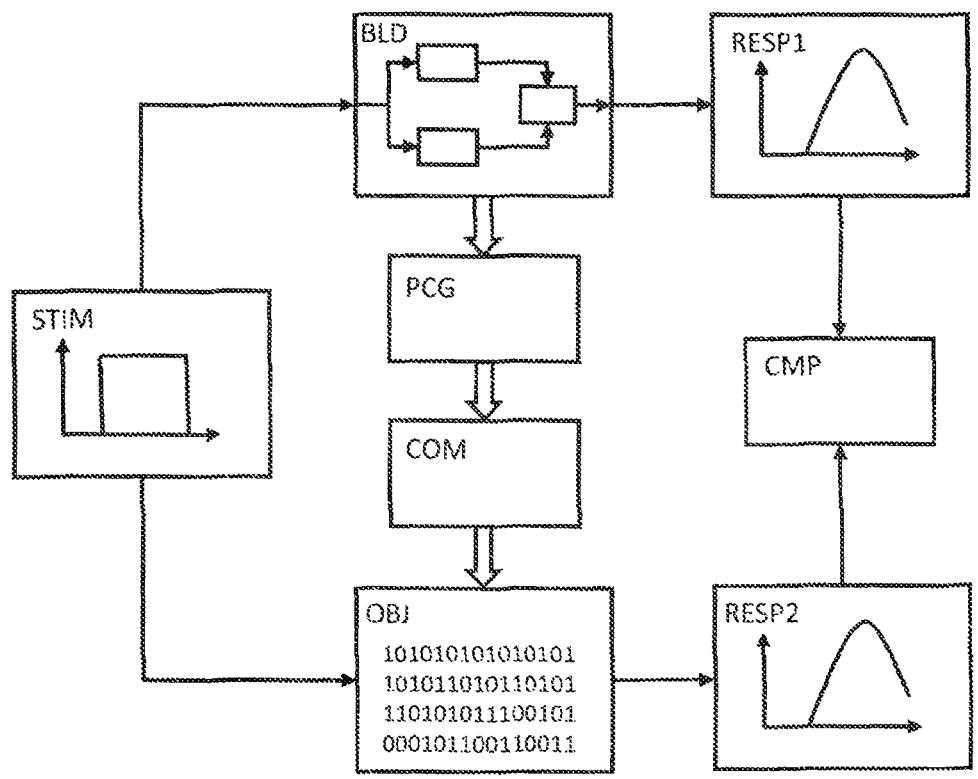
FIG. 4 is a schematic representation of the checking of the generated source code on the basis of the block diagram.

FIG. 4 schematically represents the checking of the generated source code on the basis of the block diagram.

The illustrated example schematically shows a block diagram BLD, respectively a subsystem composed of three blocks that has an input port for receiving an input signal and an output port for transmitting an output signal. The block diagram may expediently describe a predetermined or desired behavior of a control program. If the block diagram is executed in the simulation environment, the behavior is then computed for successive time steps; in particular, block diagram BLD may be directly interpreted here. From the specification, respectively the intended application, a few test cases were ascertained in advance, which, in particular included stimuli STIM as input signals for the control program, an output signal RESP indicative thereof being associated with the stimuli.

In the example shown, a stimulus STIM is shown as a diagram which indicates a specific temporal behavior of the input signal. When the control program, respectively block diagram BLD is executed in the simulation environment of the computer system, an instantaneous value of stimulus STIM is applied to the input port of block diagram BLD for a multiplicity of time steps, and the operations corresponding to the blocks are computed to ascertain an internal state and/or an output signal of the control program. By recording the output signal during execution of the block diagram, a target response RESP1 may be ascertained in a model-in-the-loop simulation. Since all arithmetic operations are computed at high precision, for example, by variables always having the double data type, and thus floating point computations being performed, on the one hand, the correct behavior of the model may be verified and, on the other hand, the simulation result is accurate enough for the stored output signal, respectively the target response RESP1 to be used as reference data.

Thus, once the correctness of the model is confirmed, code generator PCG generates source code from the blocks of the block diagram corresponding to the control program. The generated source code is subsequently compiled by a compiler COM into object code OBJ, which expediently contains instructions for the processor of the target system. The object code is preferably combined by a linker into an executable file in the operating system of the target system. During code generation, settings for converting the model operations into fixed point representation, thus, which also include a corresponding scaling, respectively, in general, transformations to reduce the computational outlay, may be applied to make possible a real-time execution on less powerful hardware as well, such as a microcontroller of an embedded system ES.

A software-in-the-loop simulation, where the target system corresponds to computer system PC, or a processor-in-the-loop (PIL) simulation, where the target system is an embedded system, is expediently performed to ensure that the optimized version of the control program, respectively the generated source code has a behavior that corresponds to the block diagram. Here, during the predetermined execution period, the executable file having object code OBJ is fed to stimulus STIM, and the output signal of the generated source code resulting from the computations is recorded to obtain actual response RESP2.

Target response RESP1 of the model-in-the-loop (MIL) simulation may be displayed on the computer system simultaneously with actual response RESP2 of the generated code to provide the user with a visual comparison. Alternatively or additionally, a comparison of target response RESP1 and actual response RESP2 may also be computed in a comparison program CMP. This makes it possible, for example, to determine a deviation measure and/or check one or a plurality of test conditions, for example, the computation of a point-by-point difference between the actual response and the target response and the comparison with a threshold value, respectively a maximally permissible deviation.

In the context of modular development, the code generation of models or block diagrams may be subdivided into individual code generation units (CGUs). For example, selected subsystems may form a CGU, a C function being able to be implemented as an interface; this may also be predefined by dedicated blocks at a hierarchical level. In the context of code generation for an external CGU, such as an external subsystem, respectively a higher-level hierarchical block, there is then no longer a need to generate the entire code to implement the internal subsystems. Instead, code already generated for an internal CGU may be reused by generating a reference, such as a function invocation, in the code for the external CGU, and by integrating the existing code. For this, interface information is expediently stored in a data definition collection, for example, in a subsystem area. If the data definition collection is hierarchically organized as a tree, this may form one of the main branches, for example.

Figures 5, 6:
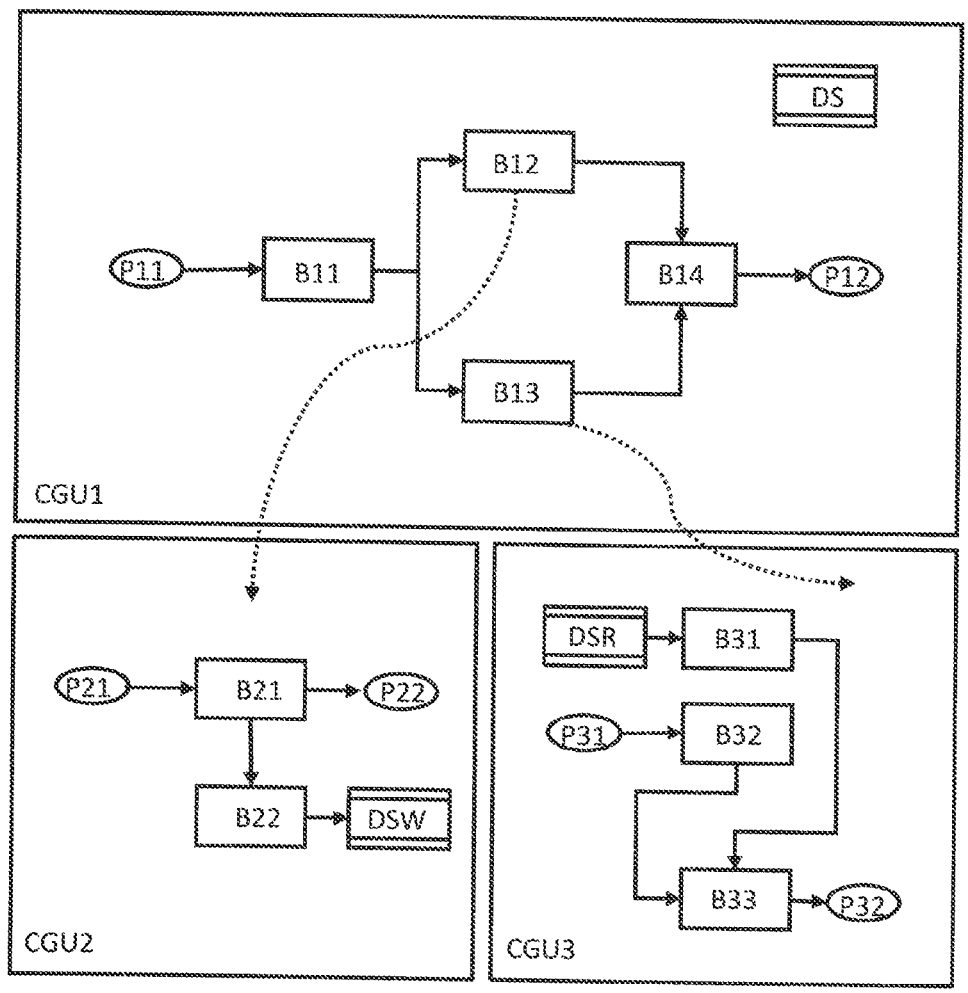
FIG. 5 shows an example of a block diagram having a plurality of incremental code generation units.
FIG. 6 shows a data structure for storing properties of incremental code generation units according to the present invention.

An example of a block diagram having a plurality of incremental code generation units is shown in FIG. 5, for example. The illustrated block diagram includes three code generation units CGU1, CGU2, CGU3. External code generation unit CGU1 may, in particular include the entire block diagram; it may also be provided, however, that code is generated only for a predefined root subsystem and all blocks referenced therein, whereas other portions of the block diagram are used only for an MTh simulation. The external CGU includes input port P11, output port P12, via which signals, respectively data are received and output, blocks B11, B12, B13, B14, which perform operations on input signals in order to generate output signals, and a data store block DS (which may also be referred to as a data store memory block), in which data may be stored. Blocks B12 and B13 are designed as hierarchical blocks which each form a CGU. CGU2 implements block B12 and includes input port P21, output port P22, blocks B21 and B22, and a data store write block DSW for writing into data store DS. CGU 3 implements block B13 and includes input port P31, output port P32, blocks B31, B32, and B33, and a data store read block DSR for reading from data store DS. Thus, data store DS represents a global memory store, respectively a global variable via which CGU2 and CGU3 may exchange data without having to be connected via signals. Thus, the data exchange between the incremental subsystems CGU2 and CGU3 takes place outside of the subsystems which model the access to the data store.

In a conventional procedure, the interface information includes the signals exchanged between the CGUs. If, for example, a further input port is added in a subordinate CGU, the interface of this subsystem changes; in the case of a code generation for the external CGU, it may be determined on the basis of the stored interface information that a renewed code generation is required for the subordinate CGU. In an incremental code generation, however, information necessary for optimizing code or for optimally embedding the production code into a runtime environment may, in certain circumstances, be missing or lost:

If the C code for the entire model is generated in a single code generation run, thus all areas of the diagram are run through during code generation, then all information about the implementation of subsystems CGU2, CGU3 contained therein is also available during optimization of the code component for implementation of external subsystem CGU1. For example, it is known whether global variables or certain resources are accessed. If, on the other hand, however, the contained subsystems are each specified as separate code generation units CGU2, CGU3, only the interface information from CGU2, CGU3 is available for the external system during code generation. On the other hand, in the code generation for external subsystem CGU, it is not known which data store blocks, respectively global variables defined in the external subsystem are actually accessed in one of the internal CGUs. Thus, in the present example, it is, in particular not known that data store write block DSW in CGU2 accesses the same global memory store as data store read block DSR in CGU3.

For example, without optimization, the code for subsystem CGU1 may correspond to the code example of a pseudocode shown in listing 1:

```
void subsystem_1( )
{
    x = DS_read( );
    // perform other modeled operations
    DS_write( );
    // perform further modeled operations
    y = x;
}
```

Listing 1—without Optimization

Here, DS_read( ) corresponds to block DSR in CGU3 and DS_write ( ) to block DSW in CGU2.

The code shown in listing 1 has the disadvantage that variable x may have been removed from the cache of the executing processor prior to the further use thereof before the contained value is used (for example, output as a result). To avoid this, a code generator optimizing, for example, for fast execution speed would change the sequence of the instructions. In particular, the optimization would attempt to draw the invocation of x=Ds_read( ); as closely as possible to the use of x (y=x;), and generate the code shown in listing 2 including optimization:

```
void subsystem_1( )
{
    // perform other modeled operations
    DS_write( );
    // perform further modeled operations
    x = DS_read( );
    y = x;
}
```

Listing 2—Including Optimization

In the present example, however, this would lead to incorrect code because DS_read( ) and DS_write( ) access the same global memory store, so that the value of x changes by invoking DS_write( ). To avoid unwanted side effects, the sequence of DS_read( ) and DS_write( ) must, therefore, be maintained.

However, it is also not desirable to completely omit the optimization or basically specify parameters in accordance with worst-case assumptions for invocations of incremental subsystems that access an externally modeled data store: This would typically lead to a poorer code quality (in particular, longer execution times). Moreover, for the same model, the code generation would generate different code depending on whether or not subordinate subsystems are handled as incremental code generation units. Such significant differences between incremental and non-incremental code generation should basically be avoided.

A certain improvement in the code quality would be made possible by a user assuring himself/herself of certain data flow properties of subordinate code generation units (CGUs), for example, that a subsystem does not have any global data flow that is not routed via the modeled inputs and outputs, or assuring himself/herself of freedom from side effects, for example, that a subsystem does not have internal states or other side effects. However, this is not only inconvenient, but also dangerous, because inaccurate data would lead to incorrect optimizations or erroneous code.

In the case of a distributed development, respectively incremental code generation, successive changes to subordinate CGUs may also lead to problems for the individual subsystems, depending on the sequence of code generation. For example, when the accesses to global variables in internal subsystems are taken into account during the code generation of the external system, erroneous code may result from the subsequent addition or removal of data store read and write blocks. It is not possible for this to be reliably determined solely on the basis of interface information, so that, for example, following insertion of a data store write block into a subordinate CGU, a user must manually start a renewed code generation for the external subsystem. In this situation, a test for a consistent code generation sequence would be desirable, so that it is automatically recognized when code must be generated again for a comprehensive code generation unit.

The present invention provides a mechanism via which the information necessary for code optimization is exchanged between the code generation units and, accordingly, made available to surrounding systems. This exchange of information preferably takes place via a data definition collection DDT, which, in particular combines all information relevant to the respective block diagram. In general, the following procedure may thereby be used:

During the code generation for an internal system, information which is relevant to the external system during the code generation is stored in the data definition collection. This may be information which is required during the code optimization for the external system, such as, for example, accesses to a global data store or, alternatively, a global variable. Alternatively or additionally, information that may be used for consistency checks may be stored, such as checksums for checking a correct code generation sequence.

A new area of data definition collection is preferably defined as a central entry point, such as, in particular, a "subsystem" area which, for example, is in the form of a main branch of a tree-like data definition collection. Under the central entry point, such information is to be preferably found that must be transferred between incremental code generation units, in particular only information relevant to code generation or, alternatively, consistency checking. It is advantageous when the need is eliminated for redundantly storing data already present at a different location; in principle, a reference to other areas of the data definition collection, that is information stored there, could also be stored.

In tabular form, FIG. 6 shows the structure of an exemplary data model in a data definition collection DDT. The left column indicates the respective hierarchy level or rather property in the DDT; the right column contains a list of values in the particular case. For each code generation unit CGU, there is a CodeGenerationUnitView area. Here, all information, which is relevant to the current CGU and is to be propagated to external systems, is stored in the LocalView object. The RequiredCodeGenerationUnits object references all CodeGenerationUnitView objects of the directly contained systems, respectively included CGUs. In this manner, a direct entry point to the relevant information of the internal subsystems is obtained in external subsystems.

Below the LocalView object, the information relevant to the CGU is expediently stored in corresponding topic-specific objects or properties. In particular, accesses to data stores or global variables may be stored in the DataStoreAccesses object. This object contains DataStoreMemoryRef properties that refer to blocks in the ModelView or BlockSpecification. Moreover, a checksum of the data store read/write accesses is preferably stored on both the CodeGenerationUnitView object and the RequiredCodeGenerationUnit object.

Generally, information may be stored in accordance with the following rule: If information required in the LocalView object of the current CGU is not available in the associated subsystem area, it is aggregated; otherwise it is referenced.

A generalized interface description for each CGU may be stored under the central entry point in the data definition collection. Preferably, this includes
  all global variables via which information is tapped from the outside or routed thereto;
  all invoked functions of an application programming interface (API) or an application interface;
  all resources which are accessed
  the quality, that is type of accesses: read/write/both
  In addition, in the case of write accesses, it may be noted whether they are guaranteed to be made consistently and to the complete variable. If both read and write access to a global variable takes place, then it is preferably noted whether the writing is guaranteed to take place before the reading.
  information about states and side effects
  use of interface data types
Thus, the code generator may read out, for example, whether write and read accesses may be optimized or shifted, or which parts of an interface definition may be omitted.

In exemplary embodiments of the present invention, a generalized access description may be used not only for subsystems, but also for other contents external to the current CGU, such as external functions, user-script functions and custom code II blocks, which include an option of integrating code. This information need not have the same scope as the information stored using subsystems, but may also include only components thereof. In particular, only information for accessing data stores or global variables may be stored by external functions or custom code II blocks.

Exemplary embodiments of the present invention also make it possible to communicate one or a plurality of further properties of the production code generated for the CGU to users and the environment, such as comprehensive subsystems of a model-based CGU:
  that it has no internal states, side effects, accesses to side effect-prone services and resources. It is thus possible to ascertain whether the function invocation of this CGU may be omitted or shifted into conditionally executed control flow branches, without changing the behavior of the complete model.
  reentrance: When the code is reentrant, the CGU code may then be instantiated multiple times, it merely being necessary that states and parameters be kept instance-specifically.
  behavior with regard to multithreading, such as, for example, freedom from external dependencies, which could stop the execution of the code.
  expected interface regarding API and services to be set externally.
  extent of the RTE to be generated for AUTOSAR code.
  whether the subsystem needs to be provided with system time in a specific unit with a specific data type (for instance, for numerical integration).
  which library contents the CGU uses, and whether they must be linked statically (such as the dsfxp fixed point library) or dynamically (such as lookup table functions).

It may also be provided that user-defined information, such as the presence of exported graphical functions or reused functions, are centrally stored. For example, a library block having information of that kind could be delivered. Exemplary embodiments of the present invention may also provide that one or a plurality of these properties be postulated and then validated.

If generalized access descriptions or also other of the above-mentioned features for external code are stored in the data definition collection, it is advantageously possible within model-based CGUs to treat CGU-external contents as known contents and, nevertheless, perform optimization on the code. Thus, an incremental code generation may be used to accelerate the development specific thereto, without paying a price in the form of limitations to code quality.

Figure 7:
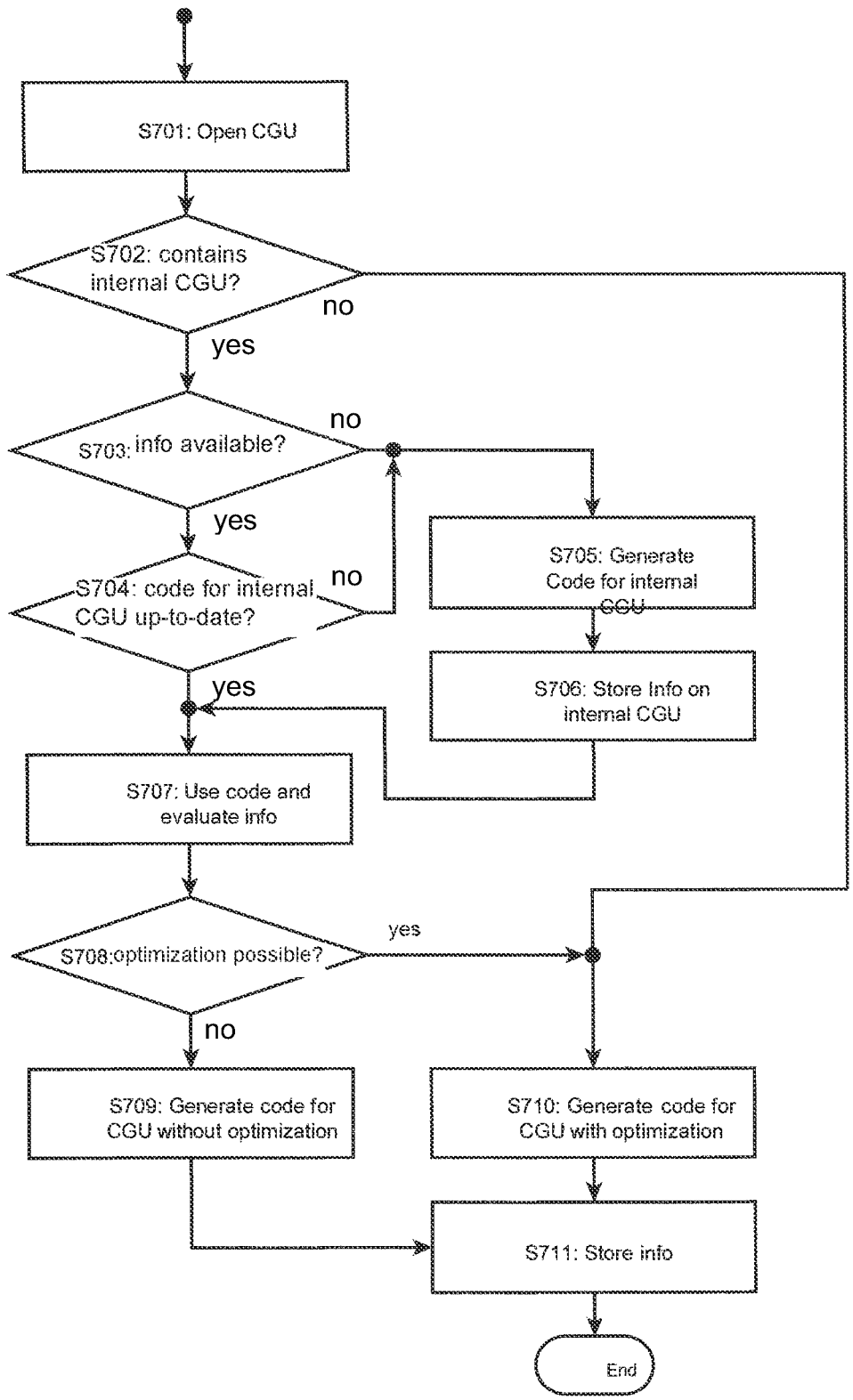
FIG. 7 is a schematic flow chart of an exemplary embodiment of the present invention.

FIG. 7 is a schematic flow chart of an exemplary embodiment of the present invention.

At the beginning, in step S701 (open CGU), a code generation unit (CGU), such as a block diagram or a subsystem, for which code is to be generated, is opened; this may preferably be accomplished in a model editor of a technical computing environment.

Step S702 subsequently checks whether the CGU contains an internal code generation unit (contains internal CGU?). If there is no internal CGU (no), it is a case of non-incremental code generation, where the entire block diagram or subsystem is run through and, accordingly, represents the only CGU; step S710 (generate code for CGU including optimization) is then performed next. When the opened CGU contains at least one internal CGU (yes), the execution continues in step S703. In principle, an external CGU may also contain a plurality of internal CGUs, for which the corresponding steps of the method are then successively performed. However, the present method may also be applied in the case of merely two incremental CGUs, an external/comprehensive CGU and an internal/contained CGU.

In step S703 (information present?), it is checked whether relevant information about the internal subsystem/the contained CGU is available. If this is not the case (no), which may occur, for example, in the case of a newly modeled subsystem, step S705 (generate code for internal CGU) is then performed next. Otherwise, step S704 (code for internal CGU up-to-date?) checks whether the model for the internal CGU was changed after the last code generation. For this purpose, for example, a checksum of the blocks of the internal CGU and/or a model version counter, which is increased at every change, may be stored in the data definition collection. Alternatively or additionally, a checksum of the last generated code and/or a code version counter, which is increased for this CGU during each code generation, may be stored in the data definition collection. If, in particular, a newly calculated checksum of the blocks of the internal CGU differs from the stored checksum for the model, a renewed code generation must subsequently take place in step S705 (generate code for CGU) because changes to the model have been made since the last code generation. Otherwise, step S707 (use code and evaluate information) may be performed at this stage.

Thus, in the case of missing information or a modified model, step S705 (generate code for internal CGU) is performed, a code generation takes place for the blocks in the internal CGU, which expediently includes all steps of the code generation that are explained in conjunction with FIG. 3, in particular an optimization of the code. Since the blocks of the internal CGU are completely run through, all relevant information about the internal CGU and the components thereof may be ascertained upon parsing of the model. Thus, for example, if no side effects are imminent due to various blocks reading and writing the same global variable, the sequence of the instructions may then be reordered in the form discussed above, making it possible for code to be produced as efficiently as possible. On the other hand, even imminent side effects would have been recognized upon running through the model. Once the code is generated, it is expediently stored, and checksums of code and/or model or version counter are updated. In step S706, the ascertained information is stored (store information on the internal CGU) in the data definition collection. The stored information also includes, in particular the type of access to a global variable or, alternatively, a global data store; the types of access are preferably stored separately for the individual global variables, so that an optimization for accessing individual variables may be carried out in a nuanced manner. In the case of a distributed development, it is advantageous when the data definition collection and generated code are stored on a central server.

If or as soon as current code and current information are available, step S707 (use code and evaluate information) is performed. The code generated for the internal subsystem/CGU is integrated in the production code for the external subsystem/CGU, it only being necessary that the external subsystem contain a reference, such as a function invocation. On the basis of the available information, it is possible to ascertain whether or not the sequence of invocations of the various internal subsystems may be changed. In principle, a nuanced optimization would also be conceivable, it being ascertained for each pair of internal subsystems or CGUs whether the invocations of these two systems may be interchanged, or whether it is necessary to omit a reordering to avoid undesired side effects.

On the basis of evaluated information, the decision is made in step S708 (optimization possible) whether (or to what extent) a reordering of the invocations of internal sub systems/CGUs may be made. If this is not the case (no), in step S709 (generate code for CGU without optimization), a code generation for the external subsystem or the comprehensive CGU is carried out without reordering the invocations of internal subsystems. The execution is subsequently continued in step S711 (store information). If a reordering is possible on the basis of the stored information, in step S710 (generate code for CGU including optimization) during the code generation, a reordering of the invocations of internal CGUs (or corresponding functions) is also permitted. Other optimizations mentioned with reference to FIG. 3 may also be performed. The generated code is expediently stored.

Finally, in step S711 (store information), the ascertained information about the comprehensive CGU is also stored in the data definition collection. The external CGU from the perspective of the discussed method may, for its part, again be used as an internal CGU or internal subsystem in a further model or block diagram.

The stored information may be stored separately for individual code generation units, in particular under the name of the CGU, in separate sections of the data definition collection. In the case of deeply nested CGU hierarchies or block diagrams having a plurality of hierarchy levels and CGUs, it is advantageous when the information about a CGU also includes aggregated information about all internal CGUs or subsystems invoked in this system. In particular, a summary description may include all global variables or data memories that any of the internal CGUs accesses.

By storing and evaluating information relating to included subsystems, the present invention makes it possible to avoid previous disadvantages of an incremental code generation, such as poorer code optimization, in a user-friendly manner.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for generating source code from one or a plurality of blocks of a block diagram, the block diagram being hierarchical and including at least a first subsystem that is configured for an incremental code generation, the first subsystem being encompassed by a second subsystem, the block diagram referencing a definition database which includes a first object, and the method comprising:
   opening, by a computer system, the block diagram including the first subsystem in a model editor;
   generating, by the computer system, source code for the first subsystem, wherein generating the source code for the first subsystem includes determining information about the first subsystem;
   storing, by the computer system, the source code for the first subsystem;
   storing, by the computer system, the information about the first subsystem in the first object; and
   generating, by the computer system, source code for the block diagram, wherein generating the source code for the block diagram includes:
      determining whether or not to reuse the stored source code for the first subsystem in generating the source code for the block diagram; and
      in response to determining to reuse the stored source code for the first subsystem, using the stored source code for the first subsystem in generating the source code for the block diagram;
   wherein the first object is read out to influence at least one parameter for generating the source code for the block diagram.

2. The method according to claim 1, wherein performance or non-performance of at least one optimization in the generation of the source code for the block diagram is based on information from the first object.

3. The method according to claim 1, wherein the source code for the second subsystem is stored; and
   wherein, in the case of a renewed code generation for the block diagram, whether new source code is generated for the second subsystem or whether the stored source code for the second subsystem continues to be used is based on information from the first object.

4. The method according to claim 1, wherein the first object includes:
   information about a global variable access modeled in the first subsystem;
   a checksum of the first subsystem;
   a checksum of code generated for the first subsystem;
   information about libraries used by the first subsystem;
   information about a resource used by the first subsystem; and/or
   information about an interface invocation modeled in the first subsystem.

5. The method according to claim 1, wherein the first subsystem includes a third subsystem;
   wherein information about global variable accesses taking place in the third subsystem and/or libraries used in the third subsystem and/or resources used by the third subsystem and/or checksums describing the third subsystem and/or information about an interface invocation modeled in the third subsystem are stored in the first object.

6. The method according to claim 4, wherein the source code for the first subsystem and/or the source code for the block diagram includes definitions of interfaces, and at least one definition is removed or shortened based on information from the first object.

7. The method according to claim 6, wherein the second subsystem models a software component in a predefined architecture;
   wherein code for defining data types and/or interfaces is created or shortened based on the first object.

8. The method according to claim 4, wherein the source code for the first subsystem and/or the source code for the block diagram is subsequently compiled and linked;
   wherein at least one reference to a library or binary file is removed from an original reference list based on information from the first object.

9. The method according to claim 1, wherein determining whether or not to reuse the stored source code for the first subsystem in generating the source code for the block diagram is based on determining whether or not the stored source code for the first subsystem is up to date.

10. A non-transitory computer-readable storage medium having processor-executable instructions stored thereon for generating source code from one or a plurality of blocks of a block diagram, the block diagram being hierarchical and including at least a first subsystem that is configured for an incremental code generation, the first subsystem being encompassed by a second subsystem, and the block diagram referencing a definition database which includes a first object, wherein the processor-executable instructions, when executed, cause the following to be performed:
   opening, by a computer system, the block diagram including the first subsystem in a model editor;
   generating, by the computer system, source code for the first subsystem, wherein generating the source code for the first subsystem includes determining information about the first subsystem;
   storing, by the computer system, the source code for the first subsystem;
   storing, by the computer system, the information about the first subsystem in the first object; and
   generating, by the computer system, source code for the block diagram, wherein generating the source code for the block diagram includes:
      determining whether or not to reuse the stored source code for the first subsystem in generating the source code for the block diagram; and in response to determining to reuse the stored source code for the first subsystem, using the stored source code for the first subsystem in generating the source code for the block diagram;

wherein the first object is read out to influence at least one parameter for generating the source code for the block diagram.

11. A computer system for generating source code from one or a plurality of blocks of a block diagram, the block diagram being hierarchical and including at least a first subsystem that is configured for an incremental code generation, the first subsystem being encompassed by a second subsystem, the block diagram referencing a definition database which includes a first object, and the system comprising:

a human-machine interface;

a non-transitory memory having processor-executable instructions stored thereon; and a processor, wherein the processor is configured to execute the processor-executable instructions to cause the computer system to perform the following:

opening the block diagram including the first subsystem in a model editor;

generating source code for the first subsystem, wherein generating the source code for the first subsystem includes determining information about the first subsystem;

storing the source code for the first subsystem;

storing the information about the first subsystem in the first object; and generating, by the computer system, source code for the block diagram, wherein generating the source code for the block diagram includes:

determining whether or not to reuse the stored source code for the first subsystem in generating the source code for the block diagram; and in response to determining to reuse the stored source code for the first subsystem, using the stored source code for the first subsystem in generating the source code for the block diagram;

wherein the first object is read out to influence at least one parameter for generating the source code for the block diagram.

* * * * *